July 17, 1923.

C. SCHNEIDER

RESILIENT TIRE

Filed Dec. 23, 1922

1,461,986

Inventor
C. Schneider

By C. A. Snow & Co.
Attorneys

Patented July 17, 1923.

1,461,986

UNITED STATES PATENT OFFICE.

CHARLES SCHNEIDER, OF HACKETT, ARKANSAS.

RESILIENT TIRE.

Application filed December 23, 1922. Serial No. 608,661.

*To all whom it may concern:*

Be it known that I, CHARLES SCHNEIDER, a citizen of the United States, residing at Hackett, in the county of Sebastian and State of Arkansas, have invented a new and useful Resilient Tire, of which the following is a specification.

This invention relates to resilient wheels, the primary object of the invention being to provide means of a mechanical structure for lending resiliency to the wheel, thereby eliminating the necessity of using a pneumatic or cushion tire thereon.

Another object of the invention is the provision of a supporting member of a flexible nature to be used in connection with the inner rim of the wheel to restrict movement of the body portion of the wheel with respect to the outer rim of the wheel.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
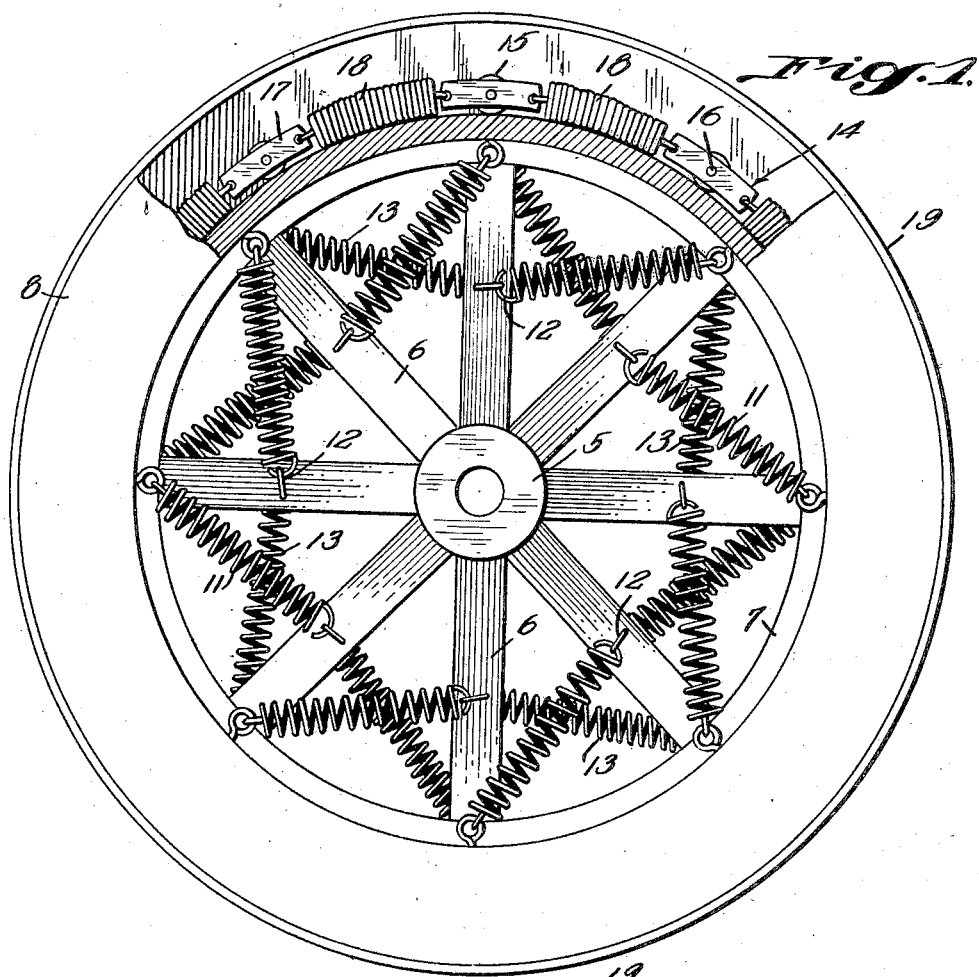
Figure 1 is a side elevational view of a wheel constructed in accordance with the invention, a portion of the outer rim being broken away to illustrate the resilient member carried within the outer rim.
Figure 2:
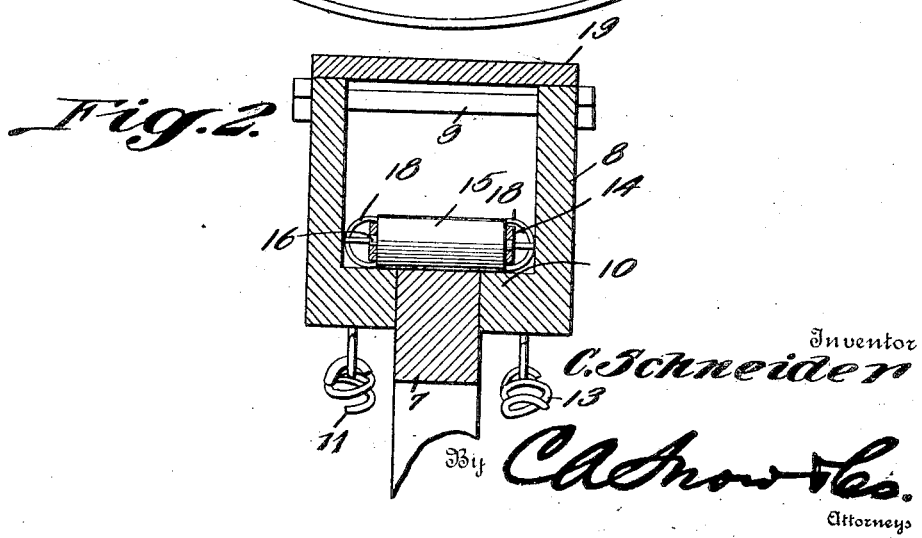
Figure 2 is a sectional view through the outer rim.

Referring to the drawing in detail, the reference character 5 designates the hub of the wheel, from which the spokes 6 radiate, the hub and spokes being constructed of any suitable material. The spokes 6 also have connection with the felloe 7 that is of a width equal to the width of the spokes, although it may be found desirable to vary the width of the felloe to adapt the wheel for a particular use.

Associated with the felloe 7 is a hollow rim including side members 8 that are connected as by means of bolts 9 arranged in spaced relation with each other throughout the circumference of the rim. Forming a part of the side members 8, are inwardly extended flanges 10 that lie in close engagement with the side edges of the felloe 7 to restrict lateral movement of the rim with respect to the felloe.

Coiled springs indicated at 11 have their outer ends connected to the under surfaces of the flanges, while the inner ends thereof have connection with the spokes at points intermediate the ends of the spokes as at 12. Thus it will be seen that the coiled springs are disposed at angles with respect to the tread of the rim 8.

On the opposite side of the wheel, are arranged coiled springs 13, which are oppositely disposed with respect to the coiled springs 11 and have their outer ends connected to the rim, while the inner ends thereof have connection with the spokes at points intermediate the ends of the spokes, to the end that coiled springs on the opposite sides of the wheel proper have direct pull in opposite directions to equalize the stress of the springs.

Positioned within the rim is the resilient felloe supporting member indicated generally by the reference character 14, which comprises a pair of spaced circular members disposed in spaced relation by means of the rollers 15 that are mounted on the shafts 16 that have their ends positioned in suitable openings provided in the connecting plates 17. Each of these spaced circular members includes a plurality of coiled springs 18, the adjacent ends of the springs being connected by means of the connecting plates 17. It might be further stated that the rollers 15 are of lengths slightly greater than the width of the felloe 7, so that the felloe may pass between the spring members 18, when depressed and engage the rollers, to exert pressure thereon.

A suitable removable tread portion 19 is secured to the side members 8 of the rim and forms one wall of the housing presented by the rim, and in which the resilient felloe supporting member moves.

It is believed that in view of the foregoing detailed description, a further detail description as to the elements of a wheel under a load is unnecessary.

What is claimed as new is:—

1. In a spring wheel, a hub, spokes radiating from the hub, a felloe connecting the spokes, a rim including spaced side members having inwardly extended flanges engaging the felloe, a resilient felloe supporting member positioned within the rim, said felloe supporting member comprising spaced spring members, and spring members connecting the rim and spokes.

2. In a spring wheel, a hub, spokes radiating from the hub, a felloe having connection with the spokes, a rim including spaced side members having inwardly extending flanges, said flanges adapted to closely engage the felloe, a felloe supporting member disposed within the rim, and including pairs of circular members, each of said circular members comprising a plurality of coiled springs, connecting plates for connecting the adjacent ends of springs, means for connecting the circular members, and coiled springs connecting the rim and spokes.

3. In a spring wheel, a hub, spokes radiating from the hub, a felloe connecting the ends of the spokes, a hollow rim positioned over the felloe and in which the felloe moves, a resilient member within the rim and comprising spaced circular members, each of the spaced circular members including a plurality of spring members and connecting plates connecting the adjacent ends of the spring members, rollers supported by the resilient member, said felloe adapted to contact with the rollers to exert pressure on the resilient member, and coiled springs connecting the spokes and rim.

4. In a spring wheel, a hub, spokes radiating from the hub, a felloe connecting the spokes, a hollow rim in which the felloe moves, a resilient member supported within the rim, said felloe adapted to engage the resilient member to move the same, and angularly disposed coiled springs connecting the spokes and rim.

In testimony that I claim the foregoing as my own, I have hereto affixed my signature in the presence of two witnesses.

CHARLES SCHNEIDER.

Witnesses:
T. R. BISHOP,
PLYMOUTH FORBES.